United States Patent [19]

Piljay et al.

[11] 4,095,313
[45] Jun. 20, 1978

[54] GAS OPERATED AUTOMATIC CANOPY RELEASE

[75] Inventors: Robert E. Piljay, Corona; Kenneth K. Craig, Riverside County, both of Calif.

[73] Assignee: H. Koch & Sons, Anaheim, Calif.

[21] Appl. No.: 751,884

[22] Filed: Dec. 17, 1976

[51] Int. Cl.² .......................................... A44B 11/25
[52] U.S. Cl. ............................. 24/230 A; 244/151 A; 294/83 A
[58] Field of Search ............. 294/83 R, 83 A, 83 AE; 24/201 R, 201 LP, 230 R, 230 A, 230 AL, 230 AP, 241 SL; 244/151 R, 151 A, 151 B

[56] References Cited

U.S. PATENT DOCUMENTS

| | | | |
|---|---|---|---|
| 3,183,568 | 5/1965 | Gaylord | 24/230 A |
| 3,330,014 | 7/1967 | Gaylord | 24/230 A |
| 3,541,651 | 11/1970 | Gaylord | 24/230 A |
| 3,624,674 | 11/1971 | Gaylord | 24/230 A |
| 3,659,322 | 5/1972 | Gaylord | 24/230 A |
| 3,766,611 | 10/1973 | Gaylord | 24/230 A |
| 3,964,138 | 6/1976 | Gaylord | 24/230 A |
| 3,994,049 | 11/1976 | Johansen et al. | 294/83 AE X |

*Primary Examiner*—Johnny D. Cherry
*Attorney, Agent, or Firm*—George B. White

[57] ABSTRACT

At least one gas operated cylinder is mounted on the female connector member of the canopy release body, the piston in the cylinder is restrained in a retracted position by a shear pin protruding in the track ahead of the piston; a roll bar transversely extended in the female member has a cutaway portion to permit the insertion of a prong of a male connector member into an intersecting pocket in the female member so that when the roll bar is turned into a corresponding recess in the prong it interlocks the connector members; the free end of the piston engages a shoulder formed in the periphery of the roll bar; the roll bar may be turned manually away from the piston into position to withdraw it from the recess in the prong, but when gas under pressure moves the piston it shears the shear pin and turns the roll bar into the disengaging position wherein the roll bar is withdrawn from said prong recess.

2 Claims, 4 Drawing Figures

GAS OPERATED AUTOMATIC CANOPY RELEASE

BACKGROUND OF THE INVENTION

The herein invention is an improvement in the type of strap connectors for canopy release shown in Gaylord U.S. Pat. Nos. 3,964,138, 3,330,014, and 3,183,568 in each of which a roll bar is used to interlock with one or more prongs inserted in the female connector member. The use of gas operated pistons for releasing interlocked elements is known, as in Gaylord U.S. Pat. No. 3,624,813, but in most of the existing canopy releases using a roll-bar, manual operation is required. For instance a locking lever has to be turned manually so as to allow the lifting of another lever connected to the roll bar to turn the roll bar to an unlocking position. In other forms complex mechanisms are provided for transmitting turning force to a roll bar.

The primary object of the invention is to provide a device of simple structure which is capable of an automatic gas actuated mode of operation for such canopy release without interfering with the usual manual operation for such release.

Another object of the invention is to provide an automatic releasing device which engages the roll bar directly yet permits the manual operation of the bar for engagement and disengagement with the prong inserted in a female connector member.

DETAILED DESCRIPTION

Figure 1:
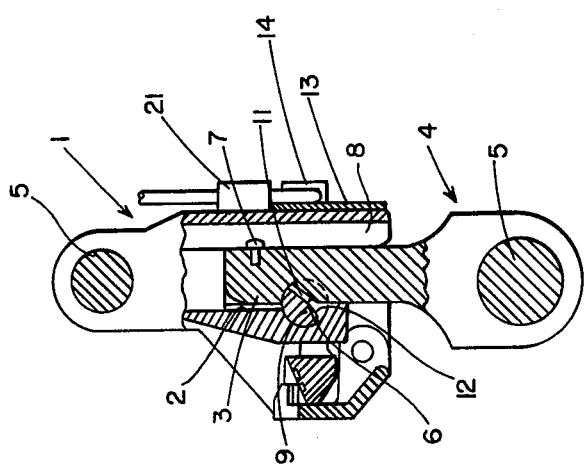
FIG. 1 shows a side view of the female connector member of the canopy release partly in section to indicate the engagement between the roll bar and the recess in the prong.

As shown in FIG. 1, the female connector member 1 has a pocket 2 into which the prong 3 of the male connector member 4 extends. Both the male and the female member have suitable pins 5 for the usual engagement by the respective straps.

The prong 3 has a recess 6 on one side thereof and has a suitable guide 7 in a groove 8 in the pocket 2 to position the prong 3 so that the prong recess 6 faces toward a transverse roll bar 9 in the female member. The roll bar 9 has a cut away portion 11 at an area opposite to the prong 3 so that when the roll bar 9 is rolled into a disengaging position, the shoulder 12 of the cutaway portion 11 is withdrawn from the prong recess 6 permitting the withdrawal of the prong 3 from the pocket 2. When the roll bar 9 is turned into the interlocking position shown in FIG. 1 then the portion of the roll bar 9 adjacent the shoulder 12 projects into the prong recess 6 and interlocks the connector members.

Figure 2:
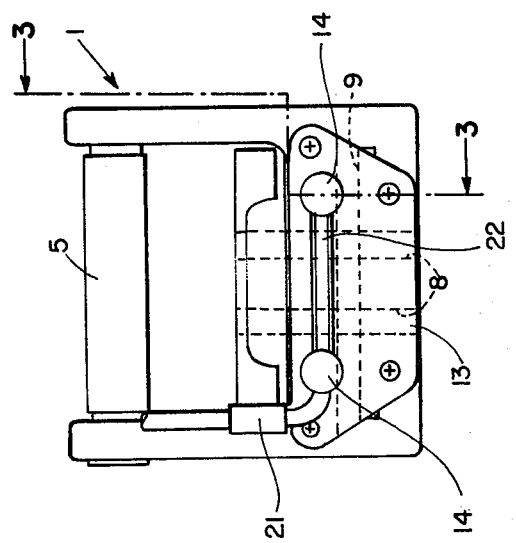
FIG. 2 is a rear view of the female connector member showing the location of the gas operated releasing devices.
Figure 3:
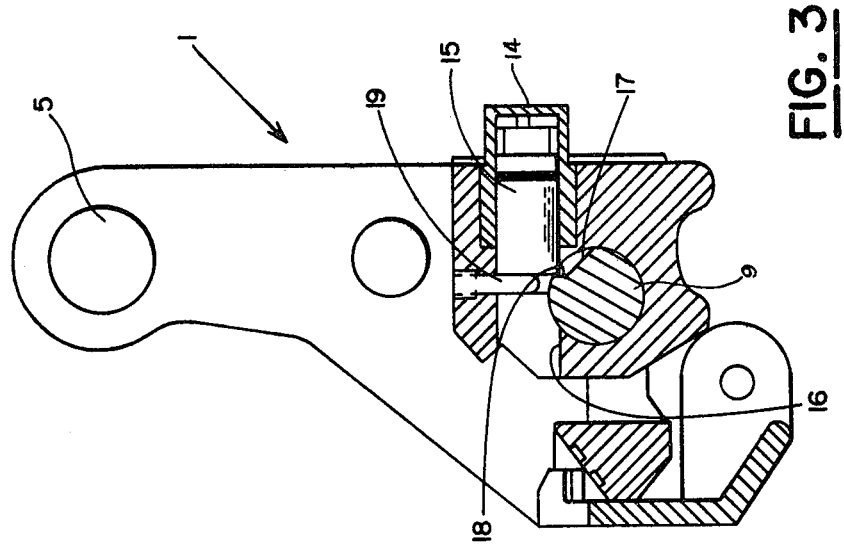
FIG. 3 is a cross sectional view of the female member taken substantially on lines 3—3 of FIG. 2 showing the releasing device in withdrawn position.

The improvement is illustrated in a form where the male connector member has two prongs. A mounting plate 13 on the back of the female member, as shown in FIG. 2, supports a pair of spaced cylinders 14 which latter are spaced each adjacent to the respective pockets 2 into which the prongs 3 are inserted. Each cylinder 14 has a piston 15 aligned with a track 16, which latter is substantially tangential to the roll bar 9. A portion of the roll bar 9 periphery projects slightly in the adjacent track 16 and is partly flattened to form a guide 17 for the piston and a shoulder 18. The piston 15 abuts against the shoulder 18, as shown in FIG. 3. A shear pin 19 projects into the track 16 ahead of the piston 15 and restrains the piston 15 in inoperative position. A suitable conduit 21 leads to one of the cylinders 14 from a source of a pressure medium such as gas under pressure, and another conduit 22 connects the cylinders 14 so as to assure simultaneous action of the pistons 15 on the roll bar 9.

Figure 4:
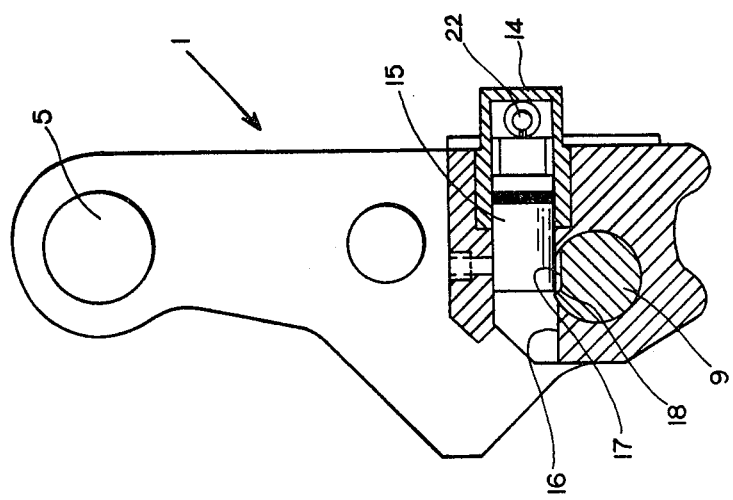
FIG. 4 is a sectional view taken on the lines 3—3 of FIG. 2 showing the releasing device after it operated and turned the roll bar.

In operation the connector members could be separated from one another manually in the usual manner as described in the aforementioned patents, without any interference by the gas operated releasing means. In case of emergency a pressure medium is admitted in any suitable manner through the conduit 21 into the cylinders 14 and causes the pistons 15 to shear the pins 19 and to press on the shoulders 18, thereby turning the roll bar 9 from the position shown in FIG. 3 into the position shown in FIG. 4 and thereby withdrawing the roll bar 9 from the prongs 3 and releasing the latter.

We claim:

1. In a releasable strap connector having a female member having a pair of spaced pockets therein and a male member having a pair of prongs fitting into said pockets, each prong having a recess therein, a rockable roll bar journalled in said female member intersecting said pockets, means to position said prongs so that said recesses face said roll bar at the intersection thereof, a portion of said roll bar at the intersection being cutaway so as to leave said pockets and said recesses unobstructed in one position of said roll bar thereby to permit insertion and withdrawal of said prongs from said pockets and in another position to project into said recesses thereby to interlock with said prongs, and manipulatable means for turning said roll bar from interlocking position to unobstructing position at will,
    the improvement of pressure medium operated means for turning said roll bar from interlocking position to unobstructing position, comprising
    a pair of tracks adjacent the respective pockets in the female member,
    a pair of abutments on said roll bar,
    a cylinder aligned with each track, and a piston in each cylinder,
    releasable restraining means in the path of each piston,
    one of said abutments on each roll bar projecting into each track,
    the piston in each cylinder being engagable with the adjacent abutment in the interlocking position of said roll bar for turning said roll bar into unobstructing position,
    and means to convey a pressure medium simultaneously into both cylinders for forcing said pistons to release said restraining means and roll said roll bar from interlocking to unobstructing position.

2. The device specified in claim 1, and
    each track being substantially tangential to the roll bar to such extent that a portion of said roll bar projects into said track,
    part of said projecting portion of said roll bar nearer to each piston being flattened to conform to the inner periphery of said track,
    a shoulder formed by each flattened part facing each piston in each track forming said abutment in direct contact with said piston.